United States Patent [19]
Yanagawa

[11] Patent Number: 6,160,768
[45] Date of Patent: Dec. 12, 2000

[54] FLOATING OPTICAL PICKUP AND INFORMATION RECORDING AND REPRODUCING APPARATUS INCLUDING THE SAME

[75] Inventor: Naoharu Yanagawa, Tokorozawa, Japan

[73] Assignee: Pioneer Electronics Corporation, Tokyo-to, Japan

[21] Appl. No.: 08/944,221

[22] Filed: Oct. 6, 1997

[30] Foreign Application Priority Data

Oct. 4, 1996 [JP] Japan .................................. 8-264964

[51] Int. Cl.⁷ .................................................. G11B 11/00
[52] U.S. Cl. .............................................. 369/13; 369/112
[58] Field of Search ................................ 369/13, 44.14, 369/112, 14, 110, 126, 116, 44.23, 44.26, 44.39; 359/664, 819

[56] References Cited

U.S. PATENT DOCUMENTS

| | | | |
|---|---|---|---|
| 5,125,750 | 6/1992 | Corle et al. ............................. | 359/819 |
| 5,689,480 | 11/1997 | Kino ........................................... | 369/14 |
| 5,764,613 | 6/1998 | Yamamoto et al. ..................... | 369/112 |
| 5,910,940 | 6/1999 | Guerra ................................... | 369/275.1 |

*Primary Examiner*—Ali Neyzari
*Attorney, Agent, or Firm*—Pitney, Hardin, Kipp & Szuch LLP

[57] ABSTRACT

An optical pickup (11) is provided with: a light source (2) for emitting a light beam (B); an objective lens (6) for condensing the emitted light beam onto an information record medium (1), which has an information record surface (1') for recording information thereon, from one external surface of the information record medium; and an immersion lens (7) disposed on an optical path of the condensed light beam between the objective lens and the information record medium for increasing a numerical aperture for the condensed light beam. The optical pickup is further provided with a floating device (33, 34, 40, 50, 45, 46, 47) for floating the immersion lens from the one external surface, such that a distance between a center of curvature of the immersion lens and the information record surface is within a predetermined tolerable range.

16 Claims, 12 Drawing Sheets

FLOATING OPTICAL PICKUP AND INFORMATION RECORDING AND REPRODUCING APPARATUS INCLUDING THE SAME

BACKGROUND OF THE INVENTION

1. Field of the Invention

The present invention generally relates to an optical pickup, which can record and reproduce the information recorded at high density in correspondence with an information record medium capable of high density recording such as a so-called DVD or the like, and an information recording and reproducing apparatus using the optical pickup.

2. Description of the Related Art

In case of recording and reproducing the information by use of a light beam such as a laser light or the like with respect to the information record medium on which the information is recorded, the light beam is condensed or focused onto an information record surface of the information record medium by use of an objective lens.

In this case, as the smaller is the size of a light spot which is formed on the information record surface by the irradiation of the light beam, the higher is the density of recording and reproducing the information. The size (i.e. the diameter) of the light spot is expressed by $\lambda/NA$, wherein NA represents a numerical aperture of the objective lens, and $\lambda$ represents a wavelength of the light beam. Thus, as the larger is the numerical aperture NA of the objective lens, it is possible to reduce the size of the light spot.

However, if the numerical aperture NA is increased too much, from the relationship with the thickness of the information record medium, the tilt at the time of recording and reproducing, or the focal depth of the light beam, the tolerable range of the thickness, tilt or focal depth decreases to exceed the servo control capability. Therefore, the practical numerical aperture NA at the present is set to be the value about 0.6.

Consequently, as a technique to improve the numerical aperture NA while maintaining the tolerable range of the thickness of the information record medium etc., a technique to insert a so-called immersion lens between the objective lens and the information record surface is presently developed, as disclosed in Applied Physics letter, Vol.57, No.57, No24, Dec. 10, 1990, pp 2515 to 2516, for example. The immersion lens is constructed such that a half sphere shaped small lens (which is called as an immersion lens) is disposed between the objective lens and the information record surface in such a state that a flat portion thereof is objected to the information record surface, so as to improve the numerical aperture NA by means of the refraction of the light beam by the immersion lens. More concretely, the immersion lens increases an incident angle $\theta$ of the light beam onto the information record surface by the refraction, so that the numerical aperture NA proportional to the sine $\theta$ is increased, without the necessity of increasing the size or thickness of the objective lens or the number of the objective lenses.

The optical pickup including the above mentioned immersion lens is provided with a support member, which supports the immersion lens and maintains the positional relationship between the immersion lens and the information record surface. Then the information record medium is not rotated, the support member contacts with the information record medium. When the information record medium is rotated, a thin layer of air is formed between the information record medium and the support member, so that the support member is spaced from the information record medium.

However, assuming that the information record medium is an optical disc for example, if the optical disc is rotated, at the initial period of the rotation, the external surface of the transparent protection layer of the optical disc is scratched by the support member, which results in a problem that the light beam is unintentionally refracted or attenuated by the scratch, and the record and reproduction of the information cannot be normally performed.

SUMMARY OF THE INVENTION

It is therefore an object of the present invention to provide an optical pickup, which can maintain the positional relationship between the immersion lens and the information record surface without scratching the external surface of the information record medium, to which the light is incident, and which is capable of high density record and reproduction, and an information recording and reproducing apparatus by use of the optical pickup.

The above object of the present invention can be achieved by an optical pickup provided with: a light source for emitting a light beam; an objective lens for condensing the emitted light beam onto an information record medium, which has an information record surface for recording information thereon, from one external surface of the information record medium; an immersion lens disposed on an optical path of the condensed light beam between the objective lens and the information record medium for increasing a numerical aperture for the condensed light beam; and a floating device for floating the immersion lens from the one external surface, such that a distance between a center of curvature of the immersion lens and the information record surface is within a predetermined tolerable range.

According to the optical pickup of the present invention, the light beam is emitted by the light source. Then, the emitted light beam is condensed onto the information record medium from one external surface thereof by the objective lens. At this time, the numerical aperture (NA) for the condensed light beam is increased by the immersion lens, which is disposed on the optical path of the condensed light beam between the objective lens and the information record medium. On the other hand, by the floating device, the immersion lens is floated from the one external surface of the information record medium, such that the distance between the center of curvature of the immersion lens and the information record surface is within a predetermined tolerable range. Since the distance between the center of curvature of the immersion lens and the information record surface is within the predetermined tolerable range, the numerical aperture (NA) is certainly improved by the immersion lens without the necessity of increasing the size or thickness of the objective lens or the number of the objective lenses, so that the high density record and reproduction can be performed. Since the immersion lens is floated, the immersion lens does not contact the information record medium, so that it is possible to prevent the information record medium from being scratched while the information record medium is moved or rotated. Therefore, it is possible to repeatedly and precisely perform the record and reproduction, and it is further possible to prevent the life of information record medium from being shortened by the scratch.

In one aspect of the optical pickup of the present invention, the floating device is provided with: a first magnet opposed to another external surface of the information record medium; a second magnet opposed to the one external surface and movable in one body with the immersion lens; and an elastic body for holding the immersion lens and the second magnet with respect to the objective lens. The floating device floats the immersion lens such that the distance between the center of curvature of the immersion lens and the information record surface is within the predetermined tolerable range, by balancing an elastic force of the elastic body and an attraction or repulsion force between the first and second magnets.

According to this aspect of the optical pickup, the immersion lens and the second magnet are held by the elastic body with respect to the objective lens. On the other hand, the first magnet is opposed to the another external surface of the information record medium, i.e., the first and second magnets are positioned at different surface sides of the information record medium. At this time, by balancing the elastic force of the elastic body and the attraction or repulsion force, the distance between the center of curvature of the immersion lens and the information record surface is within the predetermined tolerable range. Therefore, it is possible to prevent the information record medium from being scratched while the information record medium is moved or rotated, it is also possible to repeatedly and precisely perform the record and reproduction, and it is further possible to prevent the life of information record medium from being shortened by use of a rather simple construction. In addition, since the attraction or repulsion force and the elastic force are balanced, the focus servo control is not tried so that it is possible to prevent the immersion lens and the information record medium from contacting each other.

In this aspect, each of the first and second magnets may be a permanent magnet. In this case, the floating device can be rather simply constructed and the control thereof is also simplified.

In this aspect also, the information record medium may be a disc type information record medium, such as a CD (Compact Disc), an LD (Laser Disc), a DVD or the like, and the first magnet may be shaped in a disc having a same size as the disc type information record medium. In this case, it is possible to use the first magnet commonly as a holding means for holding the disc type information record medium, and any mechanism for moving the first magnet in harmonization with the movement of the objective lens is not necessary.

In this aspect also, the information record medium may be a disc type information record medium, such as a CD, an LD, a DVD or the like, and the first magnet has a wing shape for floating from the another external surface in accompaniment with a rotation of the disc type information record medium. In this case, it is possible to record and reproduce the information without scratching the another external surface of the information record medium as well as the one external surface, and it is possible to prevent the life of the information record medium from being shortened.

In this aspect also, the second magnet may be an electromagnet. In this case, it is possible to easily adjust the distance between the immersion lens and the information record medium.

In another aspect of the optical pickup of the present invention, the information record medium may be a disc type information record medium, such as a CD, an LD, a DVD or the like, and the optical pickup is further provided with a supporting member for rotatably supporting the immersion lens with respect to the objective lens around an axis in parallel to a tangential direction of a rotation of the disc type information record medium.

According to this aspect, the immersion lens is rotatably supported by the supporting member with respect to the objective lens around the axis in parallel to the tangential direction of the rotation of the disc type information record medium. Therefore, even if there exists a distortion as for the radial direction in the disc type information record medium, by the swing or tilt of the immersion lens around the axis, it is possible to keep constant the positional relationship between the immersion lens and the information record surface.

In another aspect of the optical pickup of the present invention, the floating device is provided with: a first magnet opposed to the one external surface of the information record medium; a second magnet opposed to the one external surface of the information record medium and movable in one body with the immersion lens; and an elastic body for holding the immersion lens and the second magnet with respect to the objective lens. The floating device floats the immersion lens such that the distance between the center of curvature of the immersion lens and the information record surface is within the predetermined tolerable range, by balancing an elastic force of the elastic body and an attraction or repulsion force between the first and second magnets.

According to this aspect of the optical pickup, the immersion lens and the second magnet are held by the elastic body with respect to the objective lens. On the other hand, the first magnet is opposed to the one external surface of the information record medium, i.e., the first and second magnets are positioned at a same surface side of the information record medium. At this time, by balancing the elastic force of the elastic body and the attraction or repulsion force, the distance between the center of curvature of the immersion lens and the information record surface is within the predetermined tolerable range. Therefore, it is possible to prevent the information record medium from being scratched while the information record medium is moved or rotated, it is also possible to repeatedly and precisely perform the record and reproduction, and it is further possible to prevent the life of information record medium from being shortened by use of a rather simple construction. In addition, since the attraction or repulsion force and the elastic force are balanced, the focus servo control is not tried so that it is possible to prevent the immersion lens and the information record medium from contacting each other.

In this aspect, the second magnet may be an electromagnet. In this case, it is possible to easily adjust the distance between the immersion lens and the information record medium.

In this aspect also, the optical pickup may be further provided with an actuator for driving the objective lens in a direction perpendicular to the information record surface by a reaction with a magnetic field generated by the first magnet. In this case, on one hand, the first magnet is used for generating the attraction or repulsion force to float the objective lens and the second magnet by the floating device. On the other hand, the objective is driven by the actuator by the reaction with the magnetic field generated by the first magnet, i.e., the first magnet is also used for generating the magnetic field to drive the objective lens by the actuator. Therefore, the number of components can be decreased in the optical pickup and the structure of the optical pickup can be simplified.

The above object of the present invention can be also achieved by an information recording and reproducing apparatus provided with the above described optical pickup of the present invention. The information recording and reproducing apparatus is further provided with: a modulation device for modulating the emitted light beam at the light source on the basis of record information, which is inputted from the external and which is to be recorded onto the information record medium; and a demodulation device for demodulating information detected from the information record medium on the basis of a reflection light of the condensed light beam from the information record medium.

According to the information recording and reproducing apparatus of the present invention, the information record medium is irradiated with the condensed light beam outputted by the optical pickup. Here, in the recording operation, the emitted light beam at the light source is modulated on the basis of the record information, by the modulation device. In the reproducing operation, the information detected from the information record medium is demodulated on the basis of the reflection light by the demodulation device.

Therefore, it is possible to prevent the information record medium from being scratched while the information record medium is moved or rotated, it is also possible to repeatedly and precisely perform the record and reproduction, and it is further possible to prevent the life of information record medium from being shortened, according to the information recording and reproducing apparatus.

In the information recording and reproducing apparatus of the present invention, the aforementioned optical pickup in various aspects of the present invention can be utilized.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the following embodiments, the present invention is applied to an information recording and reproducing apparatus, which can reproduce the information from an optical disc and can record the information onto the optical disc.

(I) Information Recording and Reproducing Apparatus

At first, the whole structure of an information recording and reproducing apparatus for an optical disc as an embodiment of the present invention is explained with reference to FIG. 1.

Figure 1:
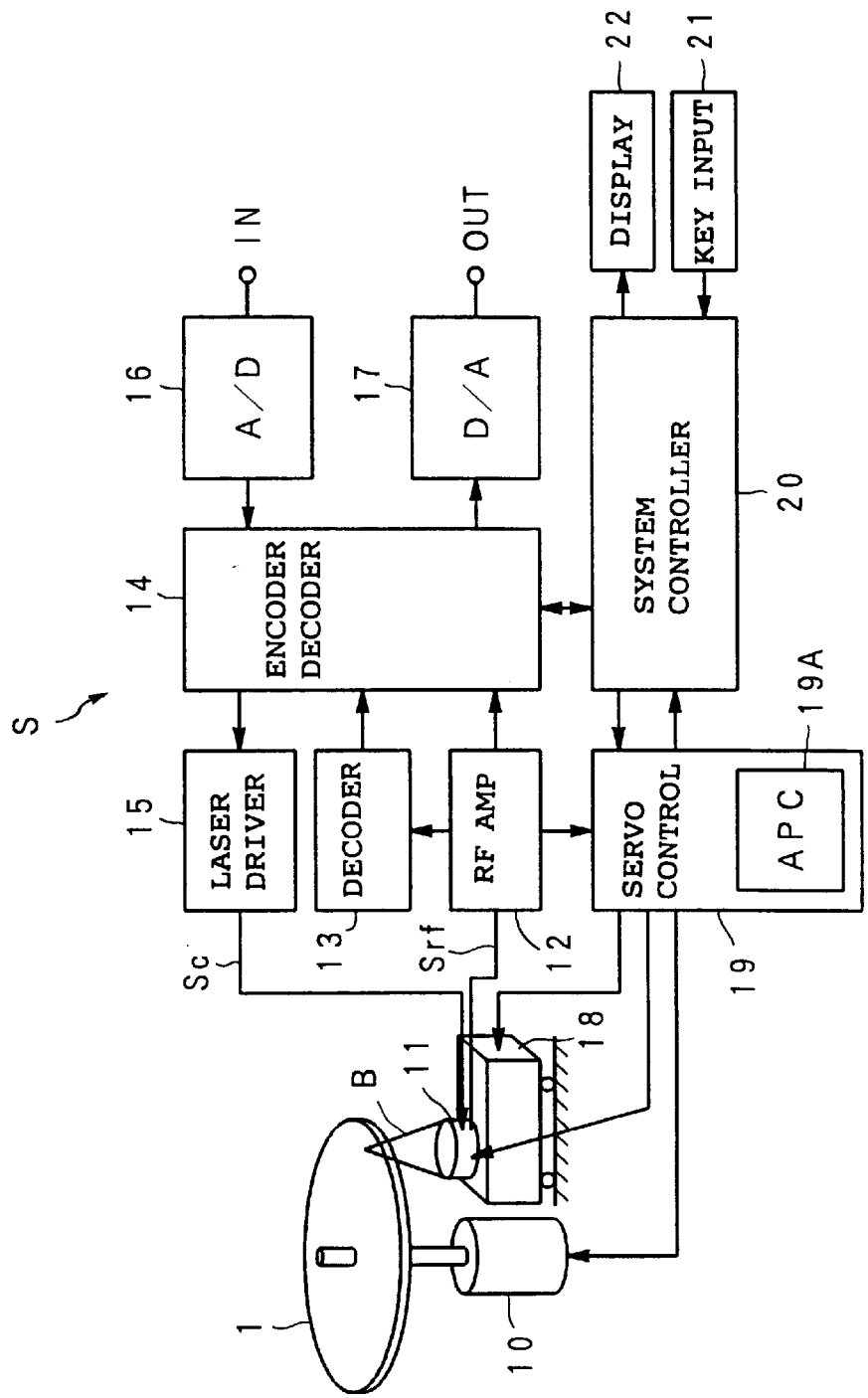
FIG. 1 is a block diagram of an information recording and reproducing apparatus for an optical disc as an embodiment of the present invention.

In FIG. 1, an information recording and reproducing apparatus S as the embodiment of the present invention is provided with: an optical pickup 11; an RF (Radio Frequency) amplifier 12; a decoder 13; an encoder/decoder section 14; a laser driver circuit 15; an A/D (Analog to Digital) converter 16; an D/A (Digital to Analog) converter 17; a carriage 18; a servo control circuit 19; a system controller 20; a key input section 21; and a display section 22.

The servo control circuit 19 is provided with an APC (Auto Power Control) circuit 19A.

Next, the operation of the information recording and reproducing apparatus S is explained.

The optical pickup 11, which includes a laser diode, an actuator, a polarization light beam splitter and so on explained later, irradiates a light beam B such as a laser light as a recording light or a reproducing light onto an optical disc 1 rotated by the spindle motor 10. Then, the optical pickup 11 outputs a signal component in the light beam B, which is reflected by the optical disc 1 and returned thereto, as an RF signal Srf.

Then, the RF amplifier 12 amplifies the RF signal Srf to a predetermined level.

After that, the decoder 13 detects the irradiation position of the light beam B on the optical disc 1, for example by detecting the wobbling frequency out of the amplified RF signal Srf, in case that the information is not recorded (or the light beam B is irradiated onto a portion where the record mark is not formed).

On the other hand, the encoder and decoder section 14 extracts the modulation (encoded) signal corresponding to the information recorded on the optical disc 1 out of the amplified RF signal Srf and decodes the extracted modulation signal. The encoder and decoder section 14 also outputs encoded (modulation) data corresponding to the information, which is inputted from the external and is to be recorded onto the optical disc 1.

Then, the laser driver circuit 15 outputs a control signal Sc to control the intensity of the laser light as a recording light of the laser diode described later, on the basis of the encoded data outputted from the encoder and decoder section 14.

Along with this, the A/D converter 16 converts the analog information signal as the information, which is inputted from the external and is to be recorded onto the optical disc 1, to digital data at the time of recording the information.

On the other hand, the D/A converter 17 converts the digital data, which is decoded (demodulated) and outputted by the encoder and decoder section 14 to the analog information signal at the time of reproducing the information.

The carriage 18 moves the optical pickup 11 in the radial direction of the optical disc 1 at the time of recording and reproducing the information.

Further, the servo control circuit 19 servo-controls the spindle motor 10, the carriage 18 and an actuator described later at the time of recording and reproducing the information.

Along with each of the above mentioned operations, the system controller 20 controls the whole of the information recording and reproducing apparatus S by means of a micro-computer or the like.

At this time, the key input section 21 gives a predetermined operation command from the external to the system controller 20. The display section 22 displays the information necessary for the operation such as the information reproducing condition and so on.

Further, the APC circuit 19A in the servo control circuit 19 controls the driving current for the laser diode, on the basis of the intensity of the light beam B detected by a monitoring photo diode which is equipped in the laser diode described later within the optical pickup 11, so that the APC circuit 19A sets the intensity of the light beam B to an output power modulated in correspondence with the control signal Sc based on the information to be recorded at the time of recording, and also keeps the intensity of the light beam B to a predetermined output power at the time of reproduction.

(II) Optical Pickup

Next, the detailed structure of the above mentioned optical pickup 11 is explained with reference to FIG. 2.

Figure 2:
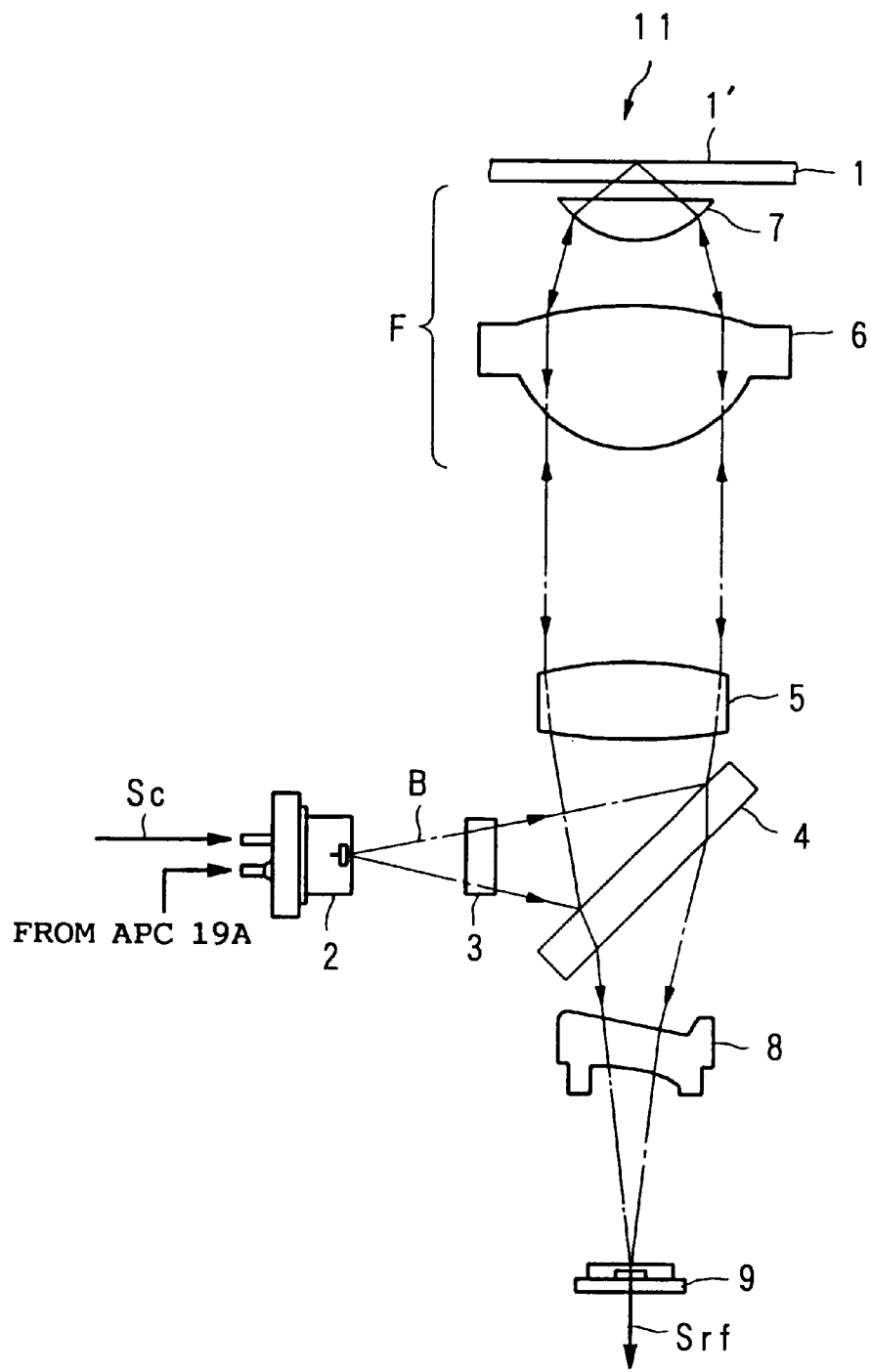
FIG. 2 is a schematic diagram showing a construction of an optical pickup used in the information recording and reproducing apparatus of FIG. 1.

In FIG. 2, the optical pickup 11 is provided with: a laser diode 2; a grating 3; a half mirror 4; a collimator lens 5; an objective lens 6; an immersion lens 7; a cylindrical lens 8; and a photo-detector 9. In this structure, a focal point forming section F for focusing the light beam B onto an information record surface 1' of the optical disc 1, is constituted by the objective lens 6 and the immersion lens 7.

Next, the operation of the optical pickup 11 is explained.

The light beam B (which intensity is modulated in correspondence with the encoded data) is emitted from the laser diode 2 under the control of the control signal Sc corresponding to the encoded data and the APC control circuit 19A. Then, the light beam B is transmitted through the grating 3, is partially reflected by the half mirror 4, is collimated by the collimator lens 5 to be a collimated light, and is inputted to the objective lens 6. Then, the light beam B inputted to the objective lens 6 is condensed by the objective lens 6 onto the immersion lens 7, is refracted by the immersion lens 7, is condensed or focused onto the information record surface 1', and is reflected by the information record surface 1'. Then, the reflected light is transmitted through an optical path same as that to the information record surface 1' to the objective lens 6 again, is transmitted through the collimator lens 5, and is partially transmitted through the half mirror 4. Then, after the astigmatism is given by the cylindrical lens 8, the reflection light is inputted to the photo-detector 9, so that the RF signal Srf is outputted in correspondence with the reflection light. After that, the RF signal Srf is converted to the reproduction signal by the RF amplifier 12, the decoder 13 and the encoder and decode section 14, and is outputted.

The photo-detector 9 is divided by division lines of cross letter shape into 4 photo-detection portions. The light detection signals of one pair of two photo-detection portions diagonally opposed to each other among these 4 photo-detection portions is added to each other. The light detection signals of another pair of two photo-detection portions diagonally opposed to each other is added to each other. Then, on the basis of the difference between the added light detection signal of one pair and the added light detection signal of another pair, the focus servo control is performed. On the basis of the total light detection signal obtained by adding these two added light detection signals, the RF signal Srf is generated.

(III) Focal Point Forming Section in the 1st Embodiment

A focal point forming section F1 (as one example of the focal point forming section F in FIG. 2) including the immersion lens 7 and the objective lens 6 in the first embodiment of the present invention is explained with reference to FIGS. 3 to 5.

In the first embodiment, the focal point forming section F1 is constructed such that the immersion lens 7 is kept to be positioned at a position gapped or spaced from the external surface of the optical disc 1 by a predetermined distance by means of a magnetic force.

Figure 3:
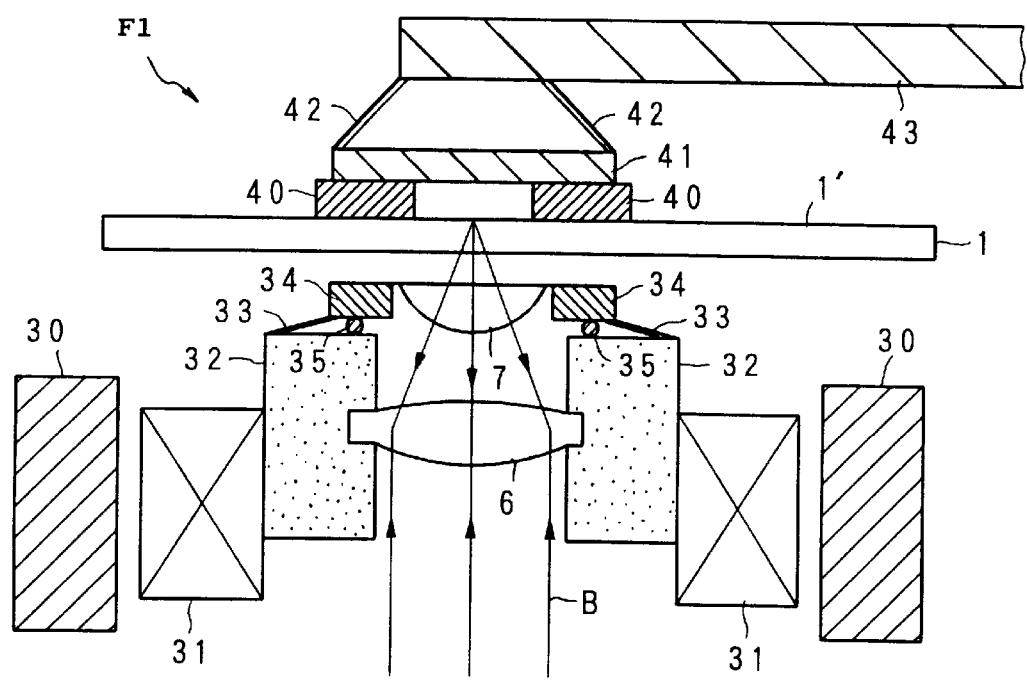
FIG. 3 is a schematic sectional view of a focal point forming section of a first embodiment of the optical pickup of the present invention.
Figure 5:
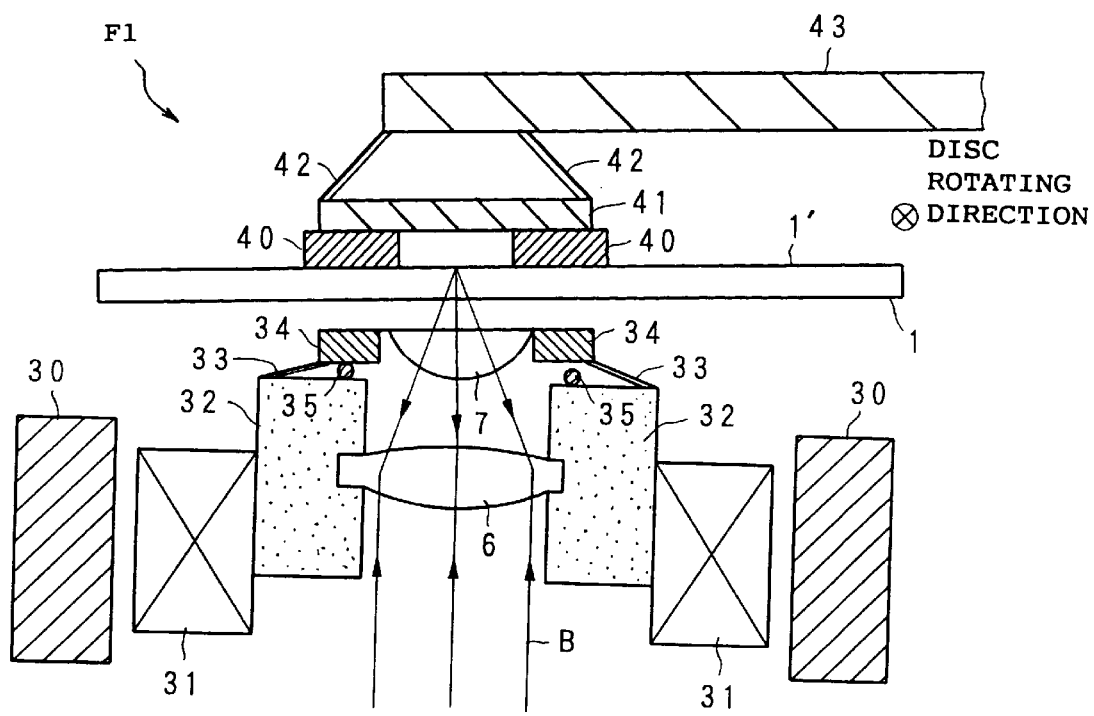
FIG. 5 is a schematic sectional view of the focal point forming section of the first embodiment in another state in operation.

Each of FIGS. 3 and 5 shows a cross section of the focal point forming section F1 in a direction parallel to the radial direction of the optical disc 1.

At first, the structure of the focal point forming section F1 is explained with reference to FIG. 3.

In FIG. 3, the focal point forming section F1 is provided with: a permanent magnet 30; an actuator 31; holders 32 and 41; suspension springs 33 and 42; a first magnet 40; a second magnet 34; a stopper 35; and an arm 43, in addition to the aforementioned objective lens 6 and the immersion lens 7.

Next, the operation of the focal point forming section F1 is explained.

The permanent magnet 30, which has a cylindrical shape and surrounds the objective lens 6, generates and applies a magnetic field in a constant direction to a space including the actuator 31, the holder 32 and the objective lens 6.

Then, the servo control circuit 19 supplies the predetermined electric current to the actuator 31, which has a cylindrical shape, to which the objective lens 6 is fixed through the holder 32, and which is constructed by a wound coil. The actuator 31 drives the objective lens 6 in the direction perpendicular to the optical disc 1 by the mutual reaction with the magnetic field generated by the permanent magnet 30, so that the focal point of the light beam B is adjusted to be positioned on the information record surface 1'. Namely, the so-called focus servo control is performed.

At this time, the holder 32, which has a cylindrical shape and fixes the objective lens 6 with respect to the actuator 31, moves the objective lens 6 in the direction perpendicular to the optical disc 1.

On the other hand, the second magnet 34 is formed of a permanent magnet, has a cylindrical shape, is disposed around and fixed on the immersion lens 7, and is movably connected to the holder 32 through the suspension spring 33 in a circular cone shape. The magnet 34 holds and moves the immersion lens 7 so as to keep constant the distance from the immersion lens 7 to the external surface (i.e. the external surface of the protection layer) of the optical disc 1 by a mutual reaction (i.e. a repulsion reaction or attraction reaction) with the first magnet 40. At this time, the stopper 35, which has a circular sectional shape and a ring plan shape and which is disposed between the second magnet 34 and the holder 32, prevents the second magnet 34 from unnecessarily separating or spacing from the optical disc 1.

On the other hand, the first magnet 40, which is positioned at an opposite side of the objective lens 6 or the immersion lens 7 with respect to the optical disc 1, is formed of a permanent magnet, has a cylindrical shape in coaxial with the second magnet 34, and is connected to the suspension spring 42 in a circular cone shape through the holder 41. The suspension spring 42 is fixed on one end of the arm 43. At this time, the other end of the arm 43 may be movably connected to the clamper for clamping the optical disc 1. Alternatively, the other end of the arm 43 may be movably connected to the case body including the permanent magnet 30, such that the optical disc 1 is inserted to the internal of a U letter shaped space prescribed by the arm 43 and the case body.

Here, the operation of the first magnet 40, the second magnet 34 and the suspension spring 33 is explained in more detail.

Namely, in case that the polarities of the magnetic fields are set such that the first magnet 40 and the second magnet 34 absorb each other (i.e., the N pole of the first magnet 40 and the S pole of the second magnet 34 are faced to each other through the optical disc 1, or the S pole of the first magnet 40 and the N pole of the second magnet 34 are faced to each through the optical disc 1), the suspension spring 33 applies the spring force against the attraction reaction in the direction to remove the second magnet 34 and the immersion lens 7, which is fixed on the second magnet 34, away from the optical disc 1 so that the second magnet 34 and the immersion lens 7 may not contact the external surface of the optical disc 1.

On the other hand, in case that the polarities of the magnetic fields are set such that the first magnet 40 and the second magnet 34 repulses each other (i.e., the N pole of the first magnet 40 and the N pole of the second magnet 34 are faced to each other through the optical disc 1, or the S pole of the first magnet 40 and the S pole of the second magnet 34 are faced to each through the optical disc 1), the suspension spring 33 applies the spring force against the repulsion reaction in the direction to move the second magnet 34 and the immersion lens 7 toward the optical disc 1.

In either of the above mentioned cases, by the balance between the spring force of the suspension spring 33 and the attraction or repulsion force of the first and second magnets 40 and 34, the immersion lens 7 is held such that the distance from the immersion lens 7 to the external surface of the optical disc 1 is within the predetermined distance range.

Next, the predetermined distance (range) from the immersion lens 7 to the external surface of the optical disc 1, within which the immersion lens 7 is to be held, is explained.

In general, the immersion lens 7 is designed such that the center of curvature of the spherical portion is positioned on the information record surface 1' of the optical disc 1. Here, by this design, it is conventional that the immersion lens 7 contacts the external surface of the optical disc 1 (i.e. the external surface of the protection layer at the under surface of the optical disc 1 in FIG. 3). Namely, by this design, it is conventional that the gap between the immersion lens 7 and the external surface of the optical lens 1 is zero.

Figure 4:
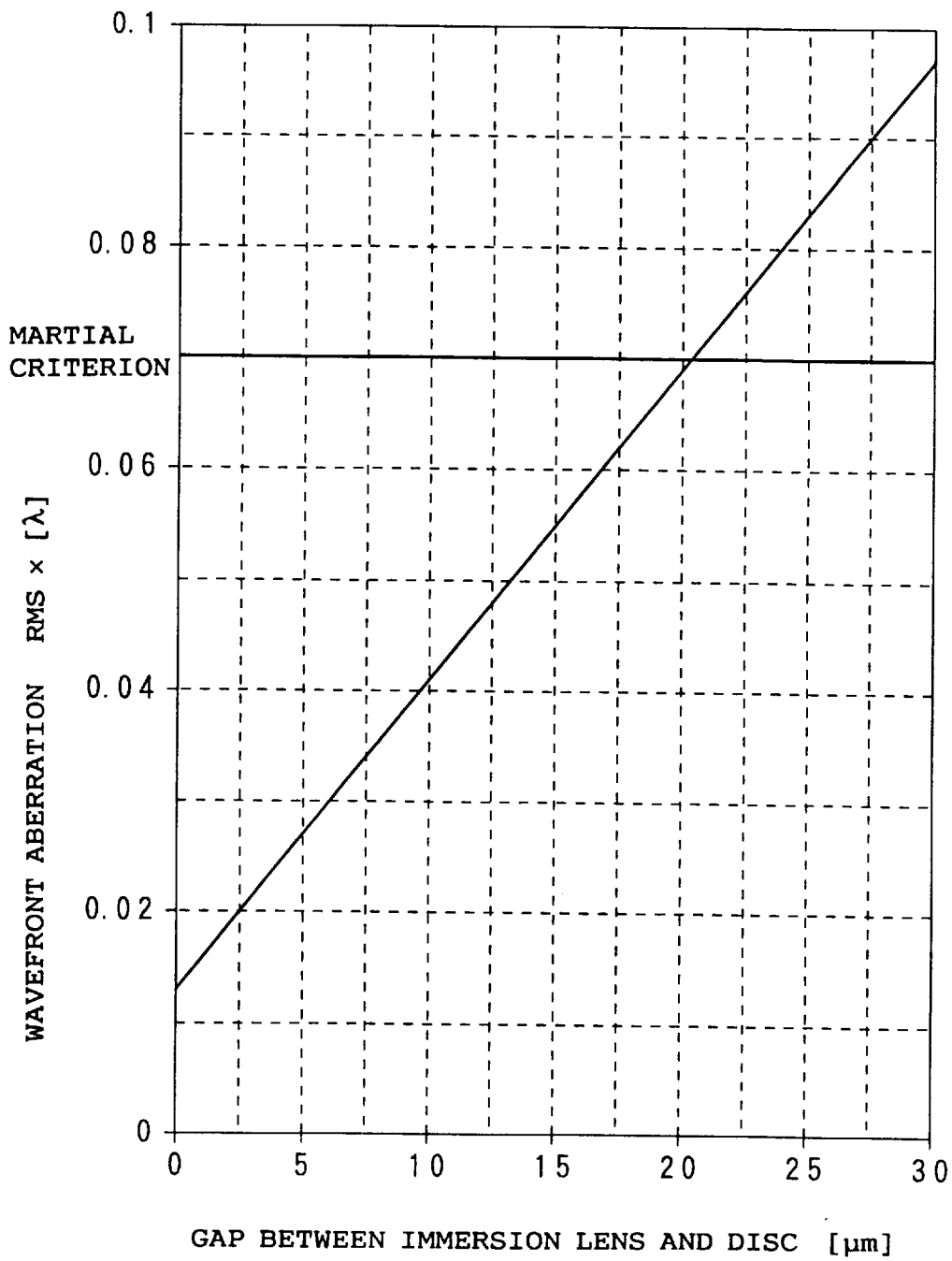
FIG. 4 is a graph showing a relationship of the wavefront aberration versus the gap between the immersion lens and the optical disc in the first embodiment.

By the way, assuming that the immersion lens 7, which is conventionally designed in the above explained manner, is removed from the external surface of the optical disc 1, the relationship between (i) a distance d, which is between the flat portion of the immersion lens 7 and the external surface of the protection layer of the optical disc 1, and (ii) wavefront aberration, which is generated in the light beam B condensed on the information record surface 1' through the immersion lens 7, is a linear relationship as shown in FIG. 4, for example.

In FIG. 4, the Martial Criterion indicates a limit of the wavefront aberration tolerable for the whole image forming optical system in the optical pickup 11 including the immersion lens 7 and the objective lens 6. Namely, if the wavefront aberration of the whole image forming optical system is not more than the Martial Criterion (e.g., 0.07 λ wherein λ represents the wavelength of the light beam B), the central intensity of the image formed on the photo-detector 9 becomes not less than 80% of the ideal case without any aberration, so that the information can be appropriately reproduced from the optical disc 1.

As clearly understood from FIG. 4, if the distance d is maintained to be equal to or less than 20 μm, it is possible to restrain the wavefront aberration to be not more than the Martial Criterion. Thus, in this case, assuming that the numerical aperture NA of the objective lens 6 is 0.5, the thickness of the protection layer of the optical disc 1 is 0.6 mm, and the radius of curvature of the spherical portion of the immersion lens 7 is 1.208 mm, the numerical aperture on the information record surface 1' of the optical disc 1 is improved to be about 0.7. Therefore, by adjusting the attraction or repulsion force of the first and second magnets 40 and 34 as well as the spring force of the suspension spring 33 so as to set the distance d to a value of not more than 20 μm, it is possible to prevent the immersion lens 7 from contacting the external surface of the protection layer and, by improving the numerical aperture of the light beam B on the information record surface 1', it is further possible to appropriately record and reproduce the information corresponding to the information pits at high resolution (i.e., while the size of the information pit formed on the information record surface 1' is reduced).

Next, a method of adjusting the attraction or repulsion force of the first and second magnets 40 and 34 as well as the spring force of the suspension spring 33, so as to set the distance d to a value of not more than 20 μm, is explained as for a case where each of the first and second magnets 40 and 34 is a permanent magnet.

In the case where each of the first and second magnets 40 and 34 is the permanent magnet, it is enough that the position of the immersion lens 7, when the attraction or repulsion force of the first and second magnets 40 and 34 and the suspension spring 33 are balanced, is coincident with a position, which distance to the optical disc 1 is not more than 20 μm.

Here, the spring force Fs of the suspension spring 33, when the immersion lens 7 is moved by a distance x, is expressed by a following expression (1).

$$Fs = K \times x \qquad (1)$$

wherein

K: spring constant of the suspension spring 33, x: displacement of the immersion lens 7 in the direction perpendicular to the optical disc 1

On the other hand, in the case where each of the first and second magnets 40 and 34 is the permanent magnet, the attraction or repulsion force Fm between the first and second magnets 40 and 34 is expressed by a following expression (2).

$$Fm = (m_1 \times m_2)/(4 \times \pi \times \mu_0 \times r^2) \qquad (2)$$

wherein $m_1$: magnitude of magnetization of the first magnet 40

$m_2$: magnitude of magnetization of the second magnet 34

$\mu_0$: magnetic permeability in vacuum r: distance between the first and second magnets 40 and 34

(i.e. r=[the thickness of the protection layer from the external surface of the optical disc 1 to the information record surface 1']+20 $\mu$m if the flat surface of the immersion lens 7 and the surface of the second magnet 34 are on one plane)

Therefore, it is enough that the spring force Fs expressed by the expression (1) and the attraction or repulsion force Fm are balanced at the position where the distance between the first and second magnets 40 and 34 is equal to "[the thickness of the protection layer from the external surface of the optical disc 1 to the information record surface 1'+20 $\mu$m". Thus, for example, assuming that the spring constant K of the suspension spring 33 is about 3486 [N/m] (which corresponds to a case where the material of the suspension spring 33 is phosphorus bronze), the distance r is equal to "0.6 mm+20 $\mu$m", the maximum displacement of the immersion lens 7 is 100 $\mu$m, and the spring force Fs and the attraction or repulsion force Fm are balanced (i.e., Fs=Fm) at the above explained position, each necessary magnetization for the first and second magnets 40 and 34 can be expressed by a following expression (3) in case that the magnetization $m_1$ of the first magnet 40 and the magnetization $m_2$ of the second magnet 34 are equal to each other.

$$m_1=m_2\approx 4.31\times 10^{-7}\ [Wb] \quad (3)$$

Namely, in case of using the first and second magnets 40 and 34 having the magnetization expressed by the above expression (3), by setting the position of the holder 32 (i.e. the position of the actuator 31) such that the distance between the immersion lens 7 (at a position where the immersion lens 7 has been moved for 100 $\mu$m from a state where there is no magnetization) and the external surface of the optical disc 1 becomes 20 $\mu$m, the external surface of the optical disc 1 and the immersion lens 7 will never be spaced from each other for more than 20 $\mu$m after that.

In the above explanation, in case that the polarities of the first and second magnets 40 and 34 are set such that the repulsion force Fm is generated between the first and second magnets 40 and 34, the direction of the spring force Fs is directed upward in FIG. 3 while the repulsion force Fm applied to the second magnet 34 is directed downward in FIG. 3. Further, the position of the holder 32 (i.e. the position of the actuator 31) is set such that the distance between the immersion lens 7 and the external surface of the optical disc 1 becomes 20 $\mu$m, when the immersion lens 7 has been moved downward in FIG. 3 by 100 $\mu$m from the state where there is no magnetization.

On the other hand, in case that the polarities of the first and second magnets 40 and 34 are set such that the attraction force Fm is generated between the first and second magnets 40 and 34, the direction of the spring force Fs is directed downward in FIG. 3 while the repulsion force Fm applied to the second magnet 34 is directed upward in FIG. 3. Further, the position of the holder 32 (i.e. the position of the actuator 31) is set such that the distance between the immersion lens 7 and the external surface of the optical disc 1 becomes 20 $\mu$m, when the immersion lens 7 has been moved upward in FIG. 3 by 100 $\mu$m from the state where there is no magnetization.

Then, when the information is to be recorded and reproduced after the position of the immersion lens 7 is set in the above manner, the mutual positions of the immersion lens 7 and the objective lens 6 are not changed. For example, if the position of the external surface of the optical disc 1 is changed up and down directions in FIG. 3 due to the surface vibrations etc., the immersion lens 7 and the objective lens 6 are driven and moved in one body by the focus servo control by the actuator 31.

Then the optical disc 1 is started to be rotated, the first magnet 40 is slightly floated from the optical disc 1 as the thin layer of air is formed between the first magnet 40 and the optical disc 1.

Further, in the first embodiment, if the optical disc 1 is a so-called magneto optical disc, on which the information is recorded as the magnetization direction by use of the temperature of the information record surface 1' which is changed by the irradiation of the light beam B, it is preferable that the attraction or repulsion force Fm is smaller than the initialization magnetic field and the reproduction magnetic field which are used for the recording and reproducing operations for the magneto optical disc.

It is preferable to set the shape of the holder 32 (e.g., especially its length along the central axis) so that the magnetic field including the above mentioned attraction or repulsion force Fm and the magnetic field generated by the permanent magnet 30 are not interfered by each other.

Next, the behavior of the focal point forming section F including the above explained immersion lens 7 and the objective lens 6 is explained with reference to FIG. 5, as for a case where the position of the immersion lens 7 is set in such a condition that the spring force Fs and the attraction or repulsion force Fm are balanced and, after the record and reproduction of the information with respect to the optical disc 1 is started, the optical disc 1 is tilted in the radial direction thereof (i.e., as for a case where a so-called disc tilt or disc skew is generated).

When the disc tilt is generated during the record and reproduction of the information, the constitutional elements such as the holder 41 including the first magnet 40 etc. (i.e., the constitutional elements above the optical disc 1 in FIG. 5) are also tilted in correspondence with this disc tilt. Since the balance between the attraction or repulsion force Fm and the spring force Fs is still maintained at this time, the immersion lens 7 and the second magnet 34 are also tilted as shown in FIG. 5. More concretely, in the case shown in FIG. 5, if the attraction force Fm is applied between the first and second magnets 40 and 34, the immersion lens 7 and the second magnet 34 are tilted as the second magnet 34 is moved upward by the attraction force Fm. On the other hand, in the case shown in FIG. 5, if the repulsion force Fm is applied between the first and second magnets 40 and 34, the immersion lens 7 and the second magnet 34 are tilted as the second magnet 34 is moved upward by the spring force Fs (which is directed upward in FIG. 5).

Therefore, even if there exists the disc tilt in the optical disc 1, according to the focal point forming section F1 of the present embodiment, the mutual relationship between the immersion lens 7 and the optical disc 1 can be kept.

Incidentally, in the case shown in FIG. 5, the incident direction of the light beam B from a view point of the immersion lens 7 is different from that in the case shown in FIG. 3. However, in case of the immersion lens 7 which is designed under such a premise that the center of curvature is on the information record surface 1', even if the incident angle of the light beam B incident thereto is changed, the aberration etc. is not generated due to such a change. Thus, the difference in the incident direction or angle gives no harmful effect onto the record and reproduction of the information.

In the case shown in FIG. 5, the second magnet 34 is partially separated from the stopper 35 fixed on the holder 32.

According to the above explained focal point forming section F1 in the first embodiment, since the immersion lens 7 is maintained by the balance between the attraction or repulsion force Fm of the first and second magnets 40 and 34 and the spring force Fs of the suspension spring 33, even if the disc tilt etc. is generated in the optical disc 1, the mutual distance between the immersion lens 7 and the optical disc 1 is not changed. Therefore, it is possible to float the immersion lens 7 and the second magnet 34 from the external surface of the optical disc 1 while maintaining the distance between the immersion lens 7 and the optical disc 1 as a distance to give no harmful influence onto the record and reproduction of the information. Thus, there is no object contacting the external surface of the optical disc 1 at its side irradiated by the light beam B, so that the external surface of the optical disc 1 is not scratched even if the optical disc 1 is rotated. Consequently, it is possible to repeatedly perform the precise record and reproduction of the information while improving the numerical aperture of the light beam B, and it is also possible to prevent the life of the optical disc 1 from being shortened due to the scratch.

Further, by balancing the attraction or repulsion force Fm and the spring force Fs, the immersion lens 7 is floated such that the distance between the immersion lens 7 and the information record surface 1' becomes a distance within the predetermined tolerable range (e.g. 20 μm). Thus, the structure of the focal point forming section F1 can be simplified.

Furthermore, when the repulsion force Fm is applied between the first and second magnets 40 and 34, the focus servo control is not tried due to this repulsion force Fm, so that it is possible to prevent the immersion lens 7 and the optical disc 1 from contacting each other.

Incidentally, in FIG. 3, taking into consideration the movement of the objective lens 6 and the immersion lens 7 during the tracking servo control by the actuator 31 etc. including the immersion lens 7 to which the second magnet 34 is fixed, the size of the first magnet 40 may be set larger than the second magnet 34.

(IV) Focal Point Forming Section in the 2nd Embodiment

Figure 6A:
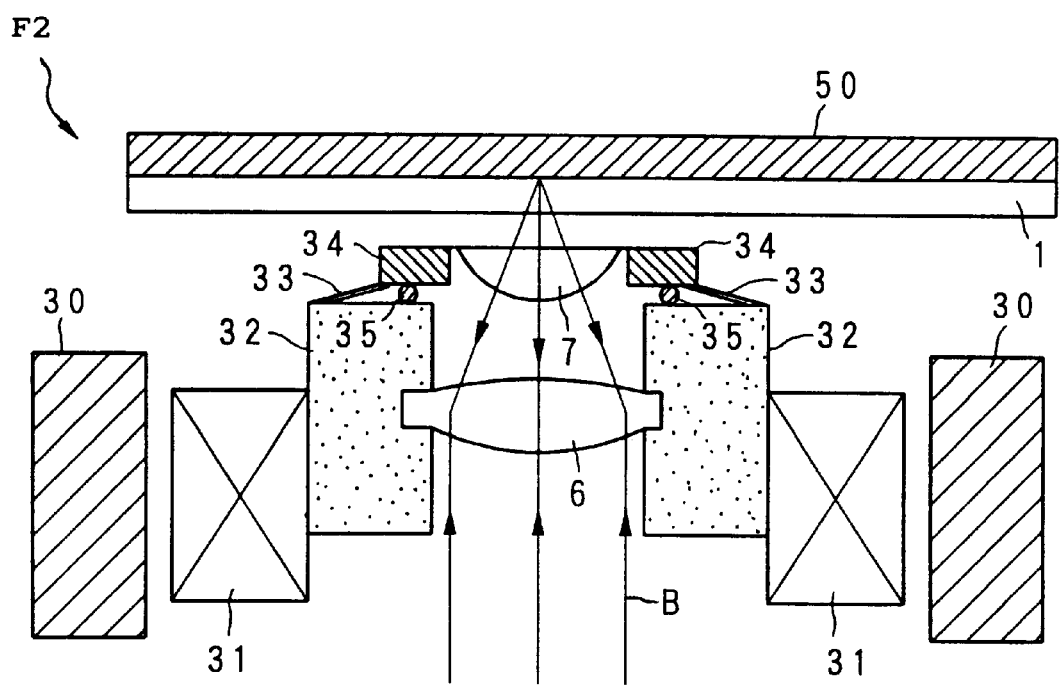
FIG. 6A is a schematic sectional view of a focal point forming section of a second embodiment of the optical pickup of the present invention.
Figure 6B:
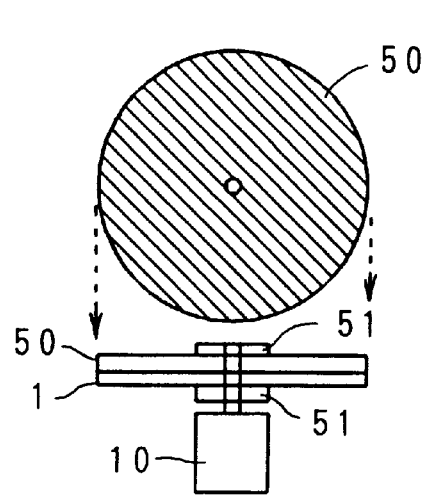
FIG. 6B is a schematic diagram showing a first example of a magnetic clamper of the second embodiment.
Figure 6C:
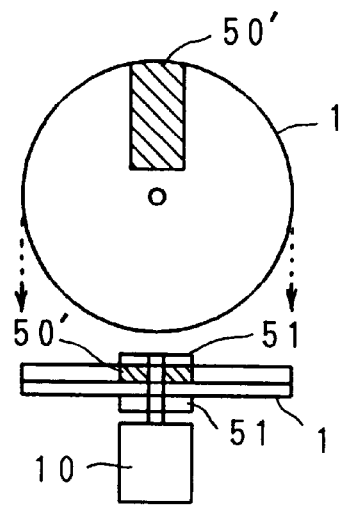
FIG. 6C is a schematic diagram showing a second example of a magnetic clamper of the second embodiment.

A focal point forming section F2 (as another example of the focal point forming section F in FIG. 2) including the immersion lens 7 and the objective lens 6 in the second embodiment of the present invention is explained with reference to FIGS. 6A, 6B and 6C. In FIG. 6A, the same constitutional elements as those in FIG. 3 carry the same reference numerals and the explanations thereof are omitted.

In the first embodiment, the immersion lens 7 is kept to be positioned at a position gapped or spaced from the external surface of the optical disc 1 by balancing the magnetic attraction or repulsion force Fm, which is applied between the second magnet 34 fixed on the immersion lens 7 and the first magnet 40 opposed to the second magnet 34, and the spring force Fs of the suspension spring 33. In contrast to this, in the second embodiment, a magnetic clamper is commonly used as the first magnet 40 and the clamper for clamping the optical disc 1.

As shown in FIG. 6A, in the second embodiment, in place of the first magnet 40 of the first embodiment, by a magnetic clamper 50 which has a same plan shape as the optical disc 1, the attraction or repulsion force Fm is generated with the second magnet 34. The magnetic clamper 50 may be constructed to be magnetized at a same plan area as the optical disc 1 as schematically shown in plan and sectional views in FIG. 6B, or may be constructed as a magnetic clamper 50' to be magnetized at only a plan area corresponding to the focal point forming section F2 as schematically shown in plan and sectional views in FIG. 6C (in this case, the magnetic clamper 50' is not rotated).

The magnitude of the magnetization per unit area of the magnetic clamper 50 or 50' may be equal to that of the first magnet 40 in the first embodiment (as expressed by the expression (3)).

As explained above, according to the focal point forming section F2 in the second embodiment, the attraction or repulsion force Fm is generated by the magnetic clamper 50 or 50' having the same plan size as the optical disc 1. Thus, it is possible to use the magnetic clamper 50 or 50' commonly as the clamper for clamping the optical disc 1 and the magnet for generating the attraction or repulsion force Fm, so that a mechanism for moving the first magnet 40 in harmonization with the movement of the objective lens 6 in the radial direction of the optical disc 1 is not necessary.

Further, since the clamper for clamping the optical disc 1 has the same plan shape as the optical disc 1, it is possible to efficiently perform the record and reproduction with the high numerical aperture by the immersion lens 7 while restraining the disc tilt of the optical disc 1 to be the minimum.

(V) Focal Point Forming Section in the 3rd Embodiment

Figure 7:
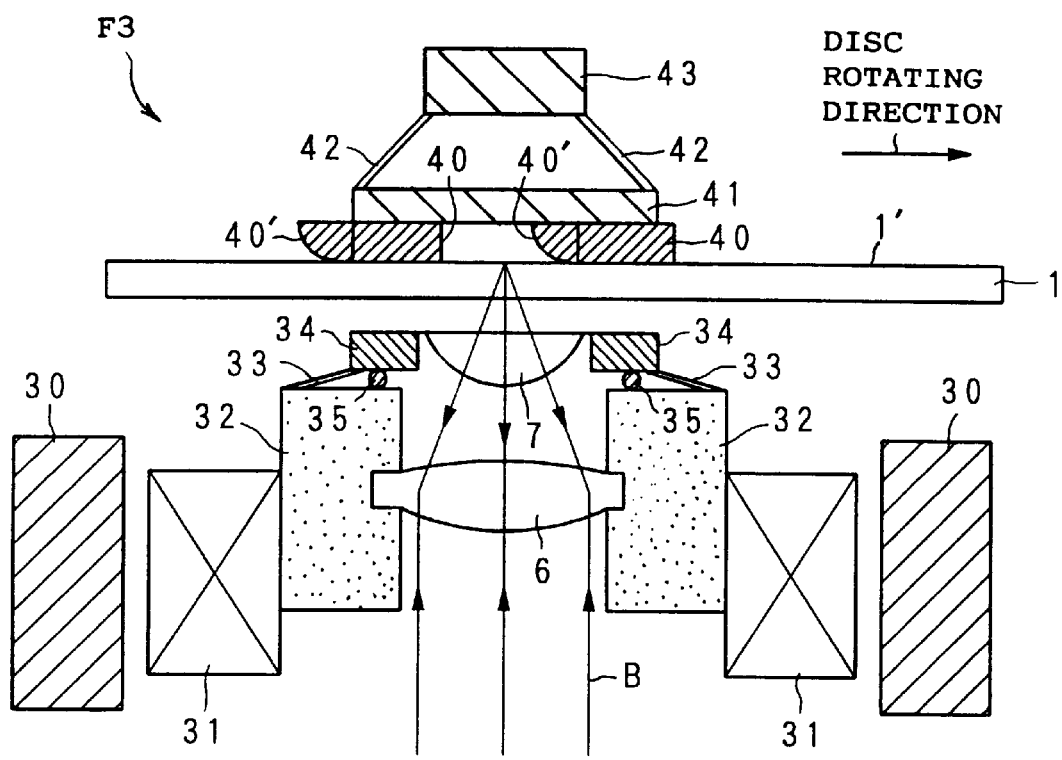
FIG. 7 is a schematic sectional view of a focal point forming section of a third embodiment of the optical pickup of the present invention.

A focal point forming section F3 (as another example of the focal point forming section F in FIG. 2) including the immersion lens 7 and the objective lens 6 in the third embodiment of the present invention is explained with reference to FIG. 7. In FIG. 7, the same constitutional elements as those in FIG. 3 or FIG. 6A carry the same reference numerals and the explanations thereof are omitted.

In the first embodiment, the immersion lens 7 is kept to be positioned at a position gapped or spaced from the external surface of the optical disc 1 by balancing the magnetic attraction or repulsion force Fm, which is applied between the second magnet 34 fixed on the immersion lens 7 and the first magnet 40 opposed to the second magnet 34, and the spring force Fs of the suspension spring 33. In contrast to this, in the third embodiment, the first magnet 40 is shaped in a so-called floating shape.

FIG. 7 is a schematic sectional view of the focal point forming section F3 in a direction parallel to the rotating direction of the optical disc 1.

As shown in FIG. 7, in the focal point forming section F3, a wing portion 40' is formed on the first magnet 40. The wing portion 40' is to promote the formation of the thin layer of air between the first magnet 40 and the optical disc 1 when the optical disc 1 is rotated.

The wing portion 40' is constructed in the same manner as a wing portion of a so-called floating head used in an HDD (Hard Disc Drive) device for magnetically recording the information, for example.

As explained above, according to the focal point forming section F3 in the third embodiment, the first magnet 40 is provided with the wing portion 40' and has the floating shape so as to float from the external surface of the optical disc 1 at the opposite side of the external surface irradiated with the light beam B in accompaniment with the rotation of the optical disc 1. Thus, it is possible to perform the record and reproduction of the information without scratching the external surface at this opposite side of the optical disc 1, and to prevent the life of the optical disc 1 from being shortened.

(VI) Focal Point Forming Section in the 4th Embodiment

Figure 8:
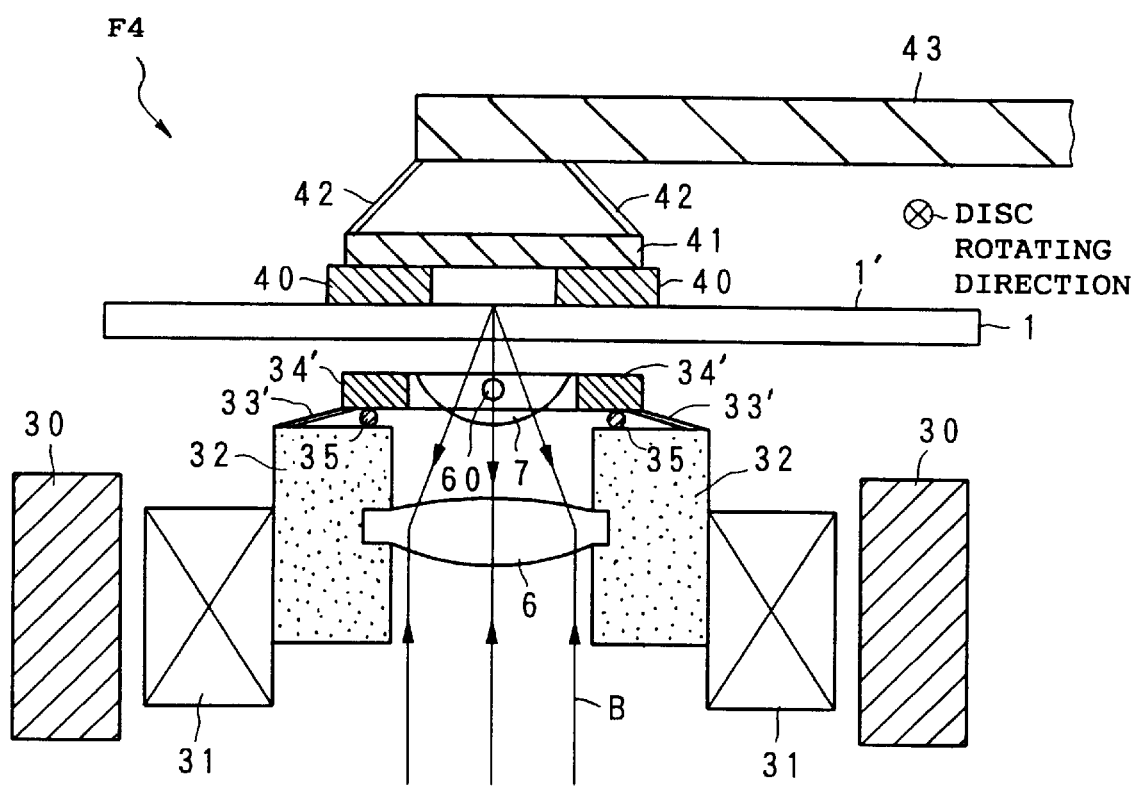
FIG. 8 is a schematic sectional view of a focal point forming section of a fourth embodiment of the optical pickup of the present invention.

A focal point forming section F4 (as another example of the focal point forming section F in FIG. 2) including the immersion lens 7 and the objective lens 6 in the fourth embodiment of the present invention is explained with reference to FIGS. 8 and 9. In FIG. 8, the same constitutional elements as those in FIG. 3, 6A or 7 carry the same reference numerals and the explanations thereof are omitted.

In the first embodiment, the stopper 35 in the ring shape is equipped between the second magnet 34 fixed on the immersion lens 7 and the holder 32, so as to prevent the immersion lens 7 from being unnecessarily spaced from the optical disc 1. In contrast to this, in the fourth embodiment, a pair of supporting bars 60, each of which is in a bar shape, are equipped to the immersion lens 7 itself in such a manner that the supporting bars 60 impale the immersion lens 7, so that the immersion lens 7 is tilted in correspondence with the disc tilt by virtue of the supporting bars 60.

FIG. 8 is a schematic sectional view of the focal point forming section F4 in a direction parallel to the rotating direction of the optical disc 1. FIG. 9 is a schematic plan view of only the portion including the immersion lens 7, a second magnet 34' and a suspension spring 33'.

In the fourth embodiment, as shown in FIG. 8, the supporting bars 60 are fixed to the immersion lens 7 as a supporting axis in such a manner that the supporting bars 60 impale the immersion lens 7 at both side edges of the immersion lens 7 (i.e., the supporting bars 60 do not penetrate the internal body of the immersion lens 7). The direction of the supporting bars 60 is set parallel to the direction of the tangential line of the rotation of the optical disc 1.

Both ends of the supporting bars 60 (i.e. the both ends at the opposite side of the immersion lens 7) are rotatably fixed on the holder 32 by a pair of supporting members 61. This condition is explained with reference to FIG. 9. Namely, the supporting bars 60 are rotatably supported by the supporting members respectively with the immersion lens 7 positioned at the center therebetween, so that the supporting bars 60 can be rotated on the supporting members 61 respectively. By this structure, even if the disc tilt is generated in the optical disc 1, since the immersion lens 7 can be rotated within a predetermined range (i.e. the range corresponding to the disc tilt) by the supporting bars 60 as the rotation axis with respect to the supporting members 61. Thus, by the balance between this rotating operation, the aforementioned attraction or repulsion force Fm and the spring force Fs, it is possible to maintain the positional relationship between the immersion lens 7 and the optical disc 1 in accompaniment with the disc tilt.

Figure 9:
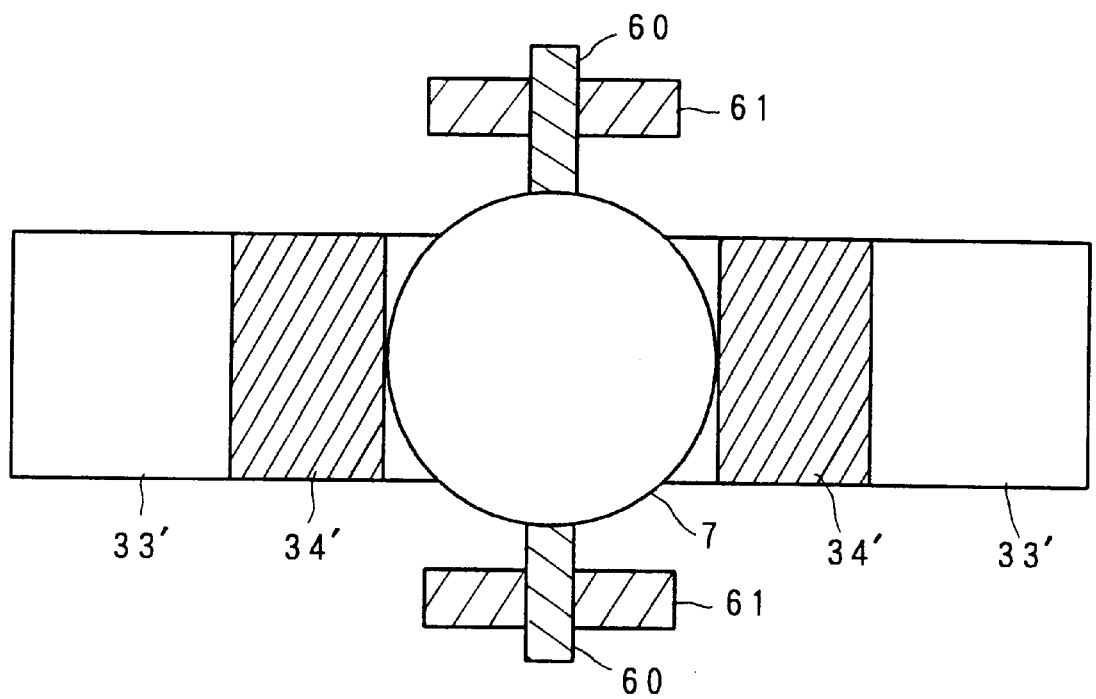
FIG. 9 is a plan view of an immersion lens and its peripheral portions of the fourth embodiment.

In the fourth embodiment, in place of the second magnet 34 in the cylindrical shape and the suspension spring 33 in the circular cone shape in the first embodiment, the second magnet 34' in a rectangular shape and a suspension spring 33' in a rectangular shape are utilized as shown in FIG. 9, which are disposed so as to sandwich the immersion lens 7.

As explained above, according to the focal point forming section F4 in the fourth embodiment, the immersion lens 7 is supported with respect to the objective lens 6 rotatably by the supporting bars 60 as the rotation axis which are parallel to the tangential direction of the rotation of the optical disc 1. Thus, even if there exists a distortion of the optical disc 1 in the radial direction thereof, it is possible to maintain the mutual positional relationship between the immersion lens 7 and the information record surface 1'.

(VII) Focal Point Forming Section in the 5th Embodiment

Figure 10:
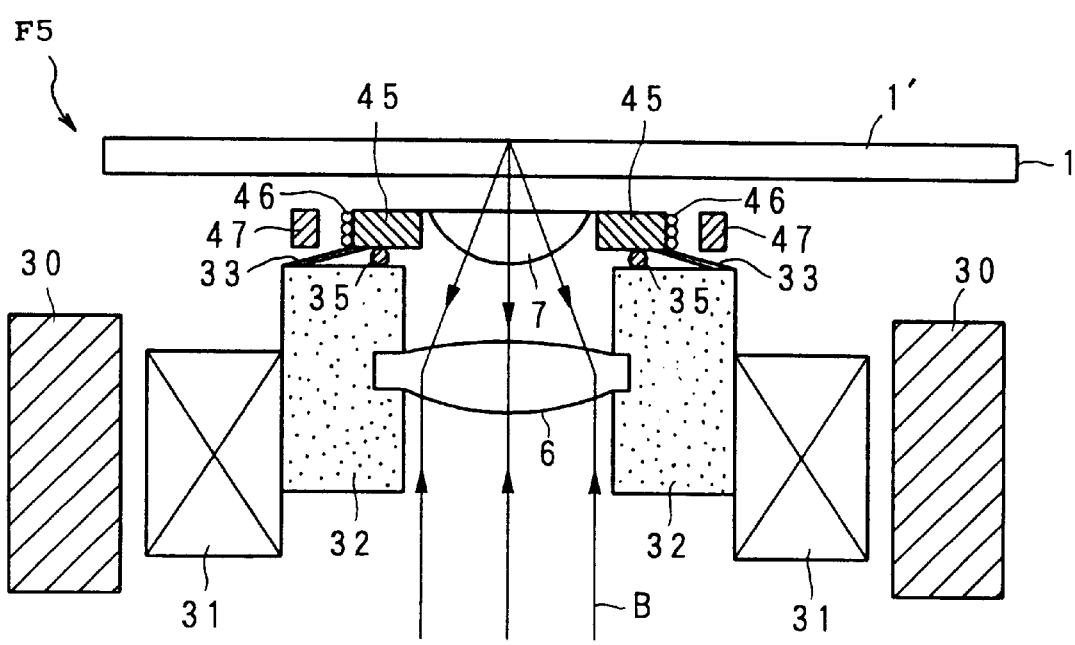
FIG. 10 is a schematic sectional view of a focal point forming section of a fifth embodiment of the optical pickup of the present invention.

A focal point forming section F5 (as another example of the focal point forming section F in FIG. 2) including the immersion lens 7 and the objective lens 6 in the fifth embodiment of the present invention is explained with reference to FIG. 10. In FIG. 10, the same constitutional elements as those in FIG. 3, 6A, 7 or 8 carry the same reference numerals and the explanations thereof are omitted.

In the above described first to fourth embodiments, the second magnet 34 is the permanent magnet. In contrast to this, in the fifth embodiment, an electro-magnet is utilized as the second magnet.

FIG. 10 is a schematic sectional view of the focal point forming section F5 in a direction parallel to the rotating direction of the optical disc 1.

In the fifth embodiment, as shown in FIG. 10, the focal point forming section F5 is provided with: a yoke 45 (i.e. a metal to be a magnetic core) in a cylindrical shape fixed on the immersion lens 7; a coil 46 which is wound around the yoke 45; and a permanent magnet 47 in a cylindrical shape formed so as to surround the immersion lens and the coil 46, in addition to the permanent magnet 30, the actuator 31, the holder 32, the suspension spring 33, the stopper 35, the objective lens 6 and the immersion lens 7. In this structure, the permanent magnet 47 is fixed on the holder 32, and is movable in one body with the objective lens 6. The coil 46 is constructed such that an electric current i described later is flown therethrough by the APC 19A.

Next, the operation of the fifth focal point forming section F5 is explained.

In the fifth embodiment, by the magnetic mutual reaction between the magnetic field generated by the permanent magnet 47 and the coil 46 through which the electric current i is flown (and which is moved in one body with the immersion lens 7), a force Fd to move the immersion lens 7 up and down directions in FIG. 10 is generated. By the balance between the force Fd and the spring force Fs, the distance between the immersion lens 7 and the external surface of the protection layer of the optical disc 1 can be maintained within the above mentioned 20 μm.

Next, a method of adjusting the force Fd and the spring force Fs so as to maintain the distance between the immersion lens 7 and the external surface of the protection layer of the optical disc 1 within 20 μm, by the balance between the force Fd and the spring force Fs, is explained.

In the case shown in FIG. 10, it is enough that (i) the position of the immersion lens 7 when the force Fd generated in the coil 46 and the spring force Fs are balanced, and (ii) the position where the distance between the immersion lens 7 and the optical disc 1 is equal to or less than 20 μm, are coincident to each other.

Here, assuming that the electric current flowing through the coil 46 is i, the length of the coil 46 is l, and the intensity of the magnetic field generated by the permanent magnet 47 is H, the force Fd generated in the coil 46 is expressed by a following expression (4).

$$Fd = i \times l \times H \qquad (4)$$

The direction of the force Fd follows the Fleming's left hand rule, according to the directions of the electric current i and the magnetic field.

On the other hand, the spring force Fs of the suspension spring 33 can be given by the aforementioned expression (1). Thus, it is enough that the spring force Fs expressed by the expression (1) and the force Fd expressed by the expression (4) are balanced to each other when the distance between the first magnet 40 and the immersion lens 7 is equal to "[the thickness of the protection layer from the external surface of the optical disc 1 to the information record surface 1']+20 μm". Namely, by setting the intensity of the electric current i flowing through the coil 46 to satisfy the relation of Fs=Fd, and setting the position of the holder 32 (i.e. the position of the actuator 31) such that the distance between the immersion lens 7 (at a position where the immersion lens 7 has been moved and is stopped) and the external surface of the optical disc 1 becomes 20 μm, the external surface of the optical disc 1 and the immersion lens 7 will never be spaced from each other for more than 20 μm after that.

In the above explanation, if the spring force Fs directed upward in FIG. 10 is given to the suspension spring 33, the direction of the electric current i flowing through the coil 46 is set so as to direct the force Fd downward in FIG. 10. Alternatively, if the spring force Fs directed downward in FIG. 10 is given to the suspension spring 33, the direction of the electric current i flowing through the coil 46 is set so as to direct the force Fd upward in FIG. 10.

As explained above, according to the focal point forming section F5 in the fifth embodiment, since the second magnet is constructed by the electro-magnet including the coil 46 etc. for the immersion lens 7, it is possible to easily change and set the distance between the immersion lens 7 and the optical disc 1.

(VIII) Focal Point Forming Section in the 6th Embodiment

Figure 11:
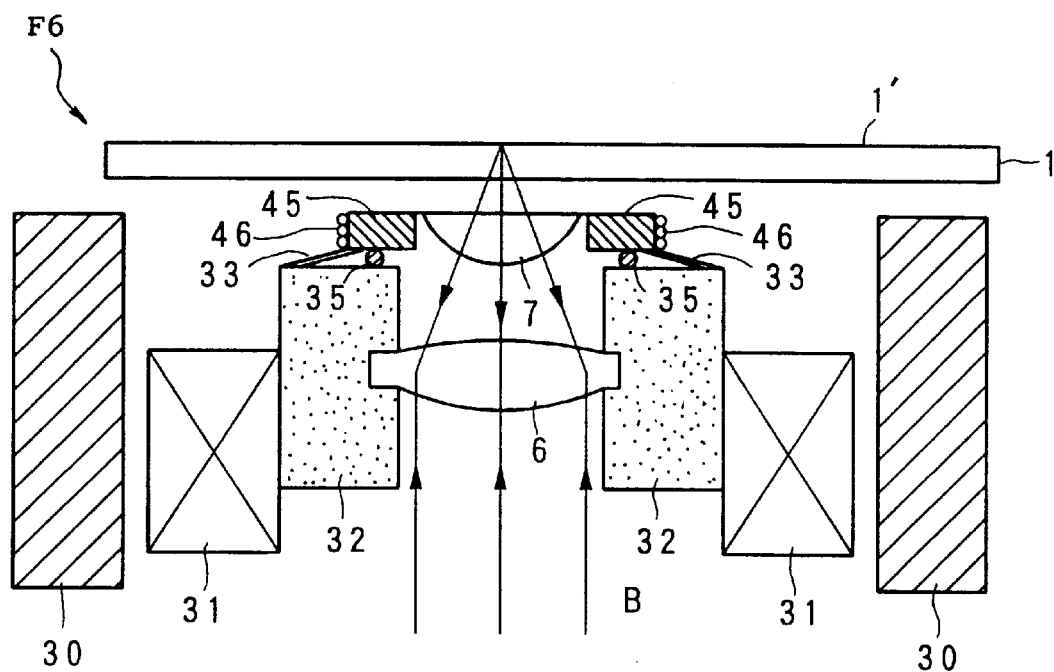
FIG. 11 is a schematic sectional view of a focal point forming section of a sixth embodiment of the optical pickup of the present invention.

A focal point forming section F6 (as another example of the focal point forming section F in FIG. 2) including the immersion lens 7 and the objective lens 6 in the sixth embodiment of the present invention is explained with reference to FIG. 11. In FIG. 11, the same constitutional elements as those in FIG. 3, 6A, 7, 8 or 10 carry the same reference numerals and the explanations thereof are omitted.

In the above described fifth embodiment, the magnetic field H is applied to the coil 46 by using the permanent magnet 47. In contrast to this, in the sixth embodiment, the aforementioned permanent magnet 30 is commonly used for applying the magnetic field H to the coil 46.

As shown in FIG. 11, in the focal point forming section F6, the permanent magnet 30 in the cylindrical shape is extended upward in a central axis direction thereof, and applies the magnetic field H to the space including the coil 46.

In this structure, the intensity of the magnetic field H generated by the permanent magnet 30 cannot be set only in consideration with the electro-magnet including the coil 46. Thus, in this case, it is preferable that the force Fd is set to an appropriate value (i.e. the value corresponding to the balance with the spring force Fs) depending upon the intensity of the electric current i flowing through the coil 46.

As explained above, according to the focal point forming section F6 in the sixth embodiment, in addition to the advantageous effect of the fifth embodiment, since the permanent magnet 30 can be commonly used, it is possible to simplify the structure of the focal point forming section F6 as a whole.

(IX) Focal Point Forming Section in the 7th Embodiment

Figure 12:
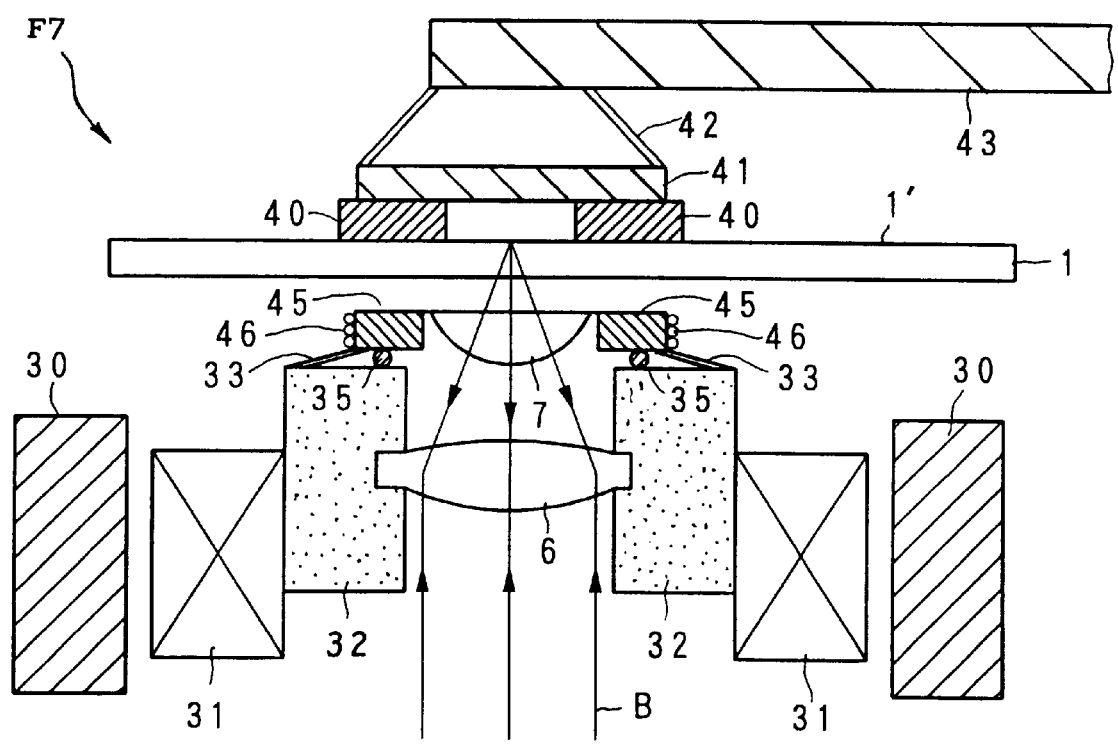
FIG. 12 is a schematic sectional view of a focal point forming section of a seventh embodiment of the optical pickup of the present invention.

A focal point forming section F7 (as another example of the focal point forming section F in FIG. 2) including the immersion lens 7 and the objective lens 6 in the seventh embodiment of the present invention is explained with reference to FIG. 12. In FIG. 12, the same constitutional elements as those in FIG. 3, 6A, 7, 8, 10 or 11 carry the same reference numerals and the explanations thereof are omitted.

In the above described fifth and sixth embodiments, the permanent magnet for applying the magnetic field H to the coil 46 is disposed on the same side of the coil 46 with respect to the optical disc 1. In contrast to this, in the seventh embodiment, by the mutual reaction between (i) the magnetic field generated by the first magnet 40 which is the permanent magnet in the first embodiment and (ii) the magnetic field generated by the coil 46 when the electric current i is flown through the coil 46, the attraction or repulsion force Fm is generated between the first magnet 40 and the coil 46, so that, by the balance between the attraction or repulsion force Fm and the spring force Fs, the distance between the immersion lens 7 and the optical disc 1 is maintained to 20 μm.

As shown in FIG. 12, the seventh embodiment is equipped with, in place of the second magnet 34 in the first embodiment (in FIG. 3), the above mentioned yoke 45 fixed on the immersion lens 7 and the coil 46, and is constructed such that the electric current i is flown through the coil 46 by the APC 19A.

Next, a method of adjusting the attraction or repulsion force Fm between the first magnet 40 and the coil 46 and the spring force Fs of the suspension spring 33 so as to maintain the distance between the immersion lens 7 and the external surface of the protection layer of the optical disc 1 within 20 μm, is explained.

In the case shown in FIG. 12, it is enough that (i) the position of the immersion lens 7 when the attraction or repulsion force Fm between the first magnet 40 and the coil 46 through which the electric current i is flowing and the spring force Fs are balanced, and (ii) the position where the distance between the immersion lens 7 and the optical disc 1 is equal to or less than 20 μm, are coincident to each other.

Here, the spring force Fs of the suspension spring 33 is expressed by the aforementioned expression (1).

On the other hand, the attraction or repulsion force Fm between the first magnet 40 and the coil 46 is obtained as following. Namely, at first, assuming that the magnitude of the magnetization of the first magnet 40 is $m_1$, the radius of the coil 46 is R, the number of turns of the coil 46 is N, the electric current flowing through the coil 46 is i, the intensity of the magnetic field H at the center of the coil 46 is expressed by a following expression $$H = (N \times i)/(2 \times R)$$

Thus, the magnetic flux Φ generated by the coil 46 is expressed by a following expression (5).

$$\Phi = \mu_0 \times H \times 2\pi R^2 \qquad (5)$$

Thus, from this expression (5) and the aforementioned expression (2), the attraction or repulsion force Fm can be expressed by a following expression (6).

$$Fm \approx (m_1 \times \Phi)/(4 \times \pi \times \mu_0 \times r^2) \qquad (6)$$

Therefore, in the same manner as in the first embodiment, it is enough that the spring force Fs expressed by the expression (1) and the attraction or repulsion force Fm expressed by the expression (6) are balanced to each other when the distance between the first magnet 40 and the coil 46 (i.e. the immersion lens 7) is equal to "[the thickness of the protection layer from the external surface of the optical disc 1 to the information record surface 1']+20 μm". Thus, for example, assuming that the spring constant K of the suspension spring 33 is about 3486 [N/m] (which corresponds to a case where the material of the suspension spring 33 is phosphorus bronze), the distance r is equal to "0.6 mm+20 μm", the maximum displacement of the immersion lens 7 is 100 μm, and the spring force Fs and the attraction or repulsion force Fm are balanced (i.e., Fs=Fm) at the above explained position, each necessary magnetization for the first magnet 40 and the coil 46 can be expressed by a following expression (7) in case that the magnetization $m_1$ of the first magnet 40 and the magnetic flux Φ generated by the coil 46 are equal to each other.

$$m_1 = \Phi \approx 4.31 \times 10^{-7} \, [Wb] \tag{7}$$

Namely, in case of using the first magnet 40 and coil 46 having the magnetization expressed by the above expression (7), by setting the position of the holder 32 (i.e. the position of the actuator 31) such that the distance between the immersion lens 7 (at a position where the immersion lens 7 has been moved for 100 μm from a state where there is no magnetization) and the external surface of the optical disc 1 becomes 20 μm, the external surface of the optical disc 1 and the immersion lens 7 will never be spaced from each other for more than 20 μm after that.

In the above explanation, in case that the polarity of the first magnet 40 and the direction of the electric current i of the coil 46 are set such that the repulsion force Fm is generated between the first magnet 40 and the coil 46, the direction of the spring force Fs is directed upward in FIG. 12 while the repulsion force Fm applied to the coil 46 is directed downward in FIG. 12. Further, the position of the holder 32 (i.e. the position of the actuator 31) is set such that the distance between the immersion lens 7 and the external surface of the optical disc 1 becomes 20 μm, when the immersion lens 7 has been moved downward in FIG. 12 by 100 μm from the state where there is no magnetization.

On the other hand, in case that the polarity of the first magnet 40 and the direction of the electric current i of the coil 46 are set such that the attraction force Fm is generated between the first magnet 40 and the coil 46, the direction of the spring force Fs is directed downward in FIG. 12 while the repulsion force Fm applied to the coil 46 is directed upward in FIG. 12. Further, the position of the holder 32 (i.e. the position of the actuator 31) is set such that the distance between the immersion lens 7 and the external surface of the optical disc 1 becomes 20 μm, when the immersion lens 7 has been moved upward in FIG. 12 by 100 μm from the state where there is no magnetization.

According to the above explained focal point forming section F7 in the seventh embodiment, since the immersion lens 7 is maintained by the balance between the attraction or repulsion force Fm of the first magnet 40 and the coil 46 and the spring force Fs of the suspension spring 33, even if the disc tilt etc. is generated in the optical disc 1, the mutual distance between the immersion lens 7 and the optical disc 1 is not changed. Therefore, it is possible to float the immersion lens 7 and the coil 46 from the external surface of the optical disc 1 while maintaining the distance between the immersion lens 7 and the optical disc 1 as a distance to give no harmful influence onto the record and reproduction of the information. Thus, there is no object contacting the external surface of the optical disc 1 at its side irradiated by the light beam B, so that the external surface of the optical disc 1 is not scratched even if the optical disc 1 is rotated. Consequently, it is possible to repeatedly perform the precise record and reproduction of the information while improving the numerical aperture of the light beam B, and it is also possible to prevent the life of the optical disc 1 from being shortened due to the scratch.

Further, by balancing the attraction or repulsion force Fm and the spring force Fs, the immersion lens 7 is floated such that the distance between the immersion lens 7 and the information record surface 1' becomes a distance within the predetermined tolerable range (e.g. 20 μm). Thus, the structure of the focal point forming section F7 can be simplified.

Further, when the repulsion force Fm is applied between the first magnet 40 and the coil 46, the focus servo control is not tried due to this repulsion force Fm, so that it is possible to prevent the immersion lens 7 and the optical disc 1 from contacting each other.

Since the second magnet is constructed by the electromagnet including the coil 46 etc. for the immersion lens 7, it is possible to easily change and set the distance between the immersion lens 7 and the optical disc 1.

As described above in detail, according to the information recording and reproducing apparatus S for the optical disc, which is equipped with the optical pickup 1 having each of the above described focal point forming sections F1 to F7 in the first to seventh embodiments, it is possible to prevent the external surface of the protection layer of the optical disc 1 from being scratched even if the optical disc 1 is rotated, it is also possible to repeatedly perform the precise record and reproduction of the information, and it is further possible to prevent the life of the optical disc 1 from being shortened.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup comprising:

a light source for emitting a light beam;

an objective lens for condensing the emitted light beam onto an information record medium, which comprises an information record surface for recording information thereon, from one external surface of said information record medium;

an immersion lens disposed on an optical path of the condensed light beam between said objective lens and said information record medium for increasing a numerical aperture for the condensed light beam; and a floating device for floating said immersion lens from said one external surface, such that a distance between a center of curvature of said immersion lens and said information record surface is within a predetermined tolerable range;

wherein said floating device comprises:

a first magnet opposed to another external surface of said information record medium;

a second magnet opposed to said one external surface and movable in one body with said immersion lens; and an elastic body for holding said immersion lens and said second magnet with respect to said objective lens;

said floating device floating said immersion lens such that the distance between the center of curvature of said immersion lens and said information record surface is within the predetermined tolerable range, by balancing an elastic force of said elastic body and an attraction or repulsion force between said first and second magnets.

2. The optical pickup according to claim 1, wherein each of said first and second magnets comprises a permanent magnet.

3. The optical pickup according to claim 1, wherein
   said information record medium comprises a disc type information record medium, and
   said first magnet is shaped in a disc having a same size as said disc type information record medium.

4. The optical pickup according to claim 1, wherein
   said information record medium comprises a disc type information record medium, and said first magnet has a wing shape for floating from said another external surface in accompaniment with a rotation of said disc type information record medium.

5. The optical pickup according to claim 1, wherein said second magnet comprises an electro-magnet.

6. An optical pickup comprising:

a light source for emitting a light beam;

an objective lens for condensing the emitted light beam onto an information record medium, which comprises an information record surface for recording information thereon, from one external surface of said information record medium;

an immersion lens disposed on an optical path of the condensed light beam between said objective lens and said information record medium for increasing a numerical aperture for the condensed light beam; and a floating device for floating said immersion lens from said one external surface, such that a distance between a center of curvature of said immersion lens and said information record surface is within a predetermined tolerable range;

wherein said floating device comprises:

a first magnet opposed to said one external surface of said information record medium;

a second magnet opposed to said one external surface of said information record medium and movable in one body with said immersion lens; and an elastic body for holding said immersion and said second magnet with respect to said objective lens;

said floating device floating said immersion lens such that the distance between the center of curvature of said immersion lens and said information record surface is within the predetermined tolerable range, by balancing an elastic force of said elastic body and an attraction or repulsion force between said first and second magnets.

7. The optical pickup according to claim 6, wherein said second magnet comprises an electro-magnet.

8. The optical pickup according to claim 6, further comprising an actuator for driving said objective lens in a direction perpendicular to said information record surface by a reaction with a magnetic field generated by said first magnet.

9. An information recording and reproducing apparatus comprising an optical pickup, said optical pickup comprising:

a light source for emitting a light beam;

an objective lens for condensing the emitted light beam onto an information record medium, which comprises an information record surface for recording information thereon, from one external surface of said information record medium;

an immersion lens disposed on an optical path of the condensed light beam between said objective lens and said information record medium for increasing a numerical aperture for the condensed light beam; and a floating device for floating said immersion lens from said one external surface, such that a distance between a center of curvature of said immersion lens and said information record surface is within a predetermined tolerable range;

said apparatus further comprising:

a modulation device for modulating the emitted light beam at said light source on the basis of record information, which is inputted from the external and which is to be recorded onto said information record medium; and a demodulation device for demodulating information detected from said information record medium on the basis of a reflection light of the condensed light beam from said information record medium;

wherein said floating device comprises:

a first magnet opposed to another external surface of said information record medium;

a second magnet opposed to said one external surface and movable in one body with said immersion lens; and an elastic body for holding said immersion lens and said second magnet with respect to said objective lens;

said floating device floating said immersion lens such that the distance between the center of curvature of said immersion lens and said information record surface is within the predetermined tolerable range, by balancing an elastic force of said elastic body and an attraction or repulsion force between said first and second magnets.

10. The apparatus according to claim 9, wherein each of said first and second magnets comprises a permanent magnet.

11. The apparatus according to claim 9, wherein said information record medium comprises a disc type information record medium, and said first magnet is shaped in a disc having a same size as said disc type information record medium.

12. The apparatus according to claim 9, wherein said information record medium comprises a disc type information record medium, and said first magnet has a wing shape for floating from said another external surface in accompaniment with a rotation of said disc type information record medium.

13. The apparatus according to claim 9, wherein said second magnet comprises an electro-magnet.

14. An information recording and reproducing apparatus comprising an optical pickup, said optical pickup comprising:

a light source for emitting a light beam;

an objective lens for condensing the emitted light beams onto an information record medium, which comprises an information record surface for recording information thereon, from one external surface of said information record medium;

an immersion lens disposed on an optical path of the condensed light beam between said objective lens and said information record medium for increasing a numerical aperture for the condensed light beam; and a floating device for floating said immersion lens from said one external surface, such that a distance between a center of curvature of said immersion lens and said information record surface is within a predetermined tolerable range;

said apparatus further comprising:

a modulation device for modulating the emitted light beam at said light source on the basis of record information, which is inputted from the external and which is to be recorded onto said information record medium; and a demodulation device for demodulating information detected from said information record medium on the basis of a reflection light of the condensed light beam from said information record medium;

wherein said floating device comprises:

a first magnet opposed to said one external surface of said information record medium;

a second magnet opposed to said one external surface of said information record medium and movable in one body with said immersion lens; and an elastic body for holding said immersion lens and said second magnet with respect to said objective lens;

said floating device floating said immersion lens such that the distance between the center of curvature of said immersion lens and said information record surface is within the predetermined tolerable range, by balancing an elastic force of said elastic body and an attraction or repulsion force between said first and second magnets.

15. The apparatus according to claim 14, wherein said second magnet comprises an electro-magnet.

16. The apparatus according to claim 14, wherein said optical pickup further comprises an actuator for driving said objective lens in a direction perpendicular to said information record surface by a reaction with a magnetic field generated by said first magnet.

* * * * *